United States Patent [19]

Sakoe

[11] 4,049,913
[45] Sept. 20, 1977

[54] SYSTEM FOR RECOGNIZING SPEECH CONTINUOUSLY SPOKEN WITH NUMBER OF WORD OR WORDS PRESELECTED

[75] Inventor: Hiroaki Sakoe, Tokyo, Japan

[73] Assignee: Nippon Electric Company, Ltd., Tokyo, Japan

[21] Appl. No.: 737,454

[22] Filed: Nov. 1, 1976

[30] Foreign Application Priority Data

Oct. 31, 1975 Japan ............... 50-132004
Feb. 20, 1976 Japan ............... 51-18346

[51] Int. Cl.² .............................. G10L 1/00
[52] U.S. Cl. .............................. 179/1 SD
[58] Field of Search ............... 179/1.5 A, 1.5 D

[56] References Cited

U.S. PATENT DOCUMENTS

| 3,553,372 | 1/1971 | Wright et al. ......... | 179/1 SD |
| 3,770,892 | 5/1972 | Clapper ............... | 179/1 SD |
| 3,816,722 | 6/1974 | Sakoe et al. .......... | 179/1 SA |

Primary Examiner—Kathleen H. Claffy
Assistant Examiner—E. S. Kemeny
Attorney, Agent, or Firm—Sughrue, Rothwell, Mion, Zinn and Macpeak

[57] ABSTRACT

A continuous speech recognition system comprises a word number specifier for specifying, as the number of continuously spoken word or words, either a single integer or a set of different integers. The single integer may be manually or automatically adjusted. In compliance with the specified word number or numbers, the system carries out pattern matching between an input pattern representative of the spoken word or words and a predetermined number of reference patterns. The matching may be carried into effect by dynamic programming. The input pattern is recognized to be one of the reference patterns or to be a concatenation of some or all of the reference patterns, equal in number either to the single integer or to one of the different integers.

6 Claims, 11 Drawing Figures

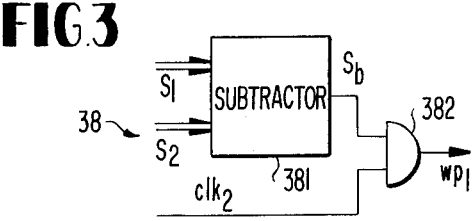
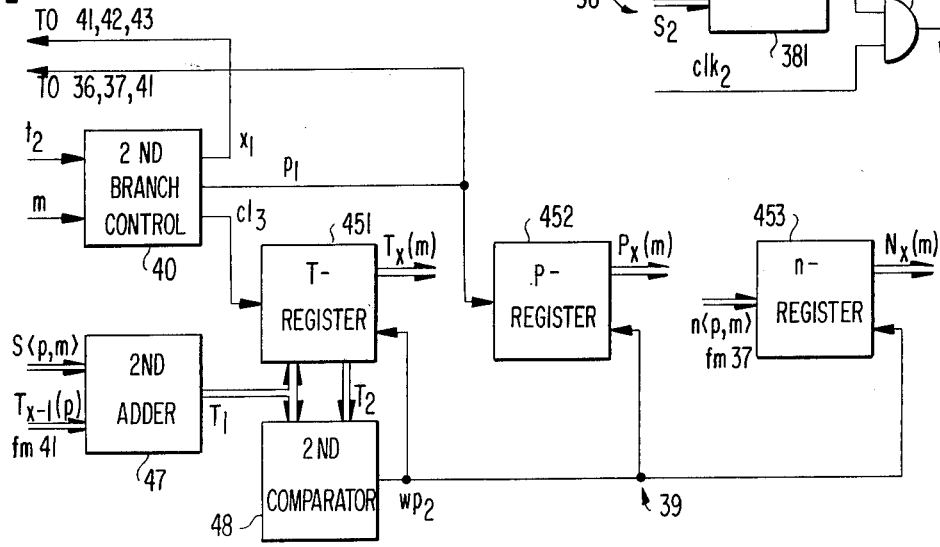
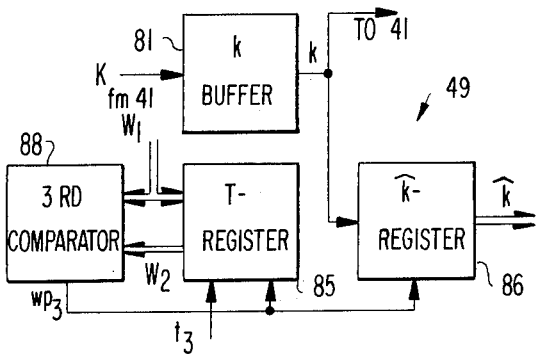
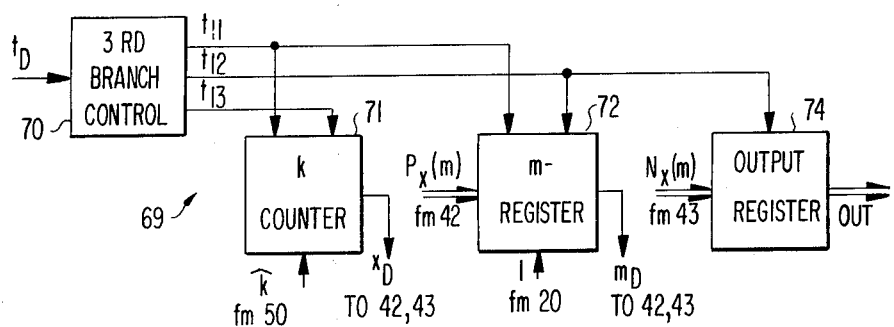
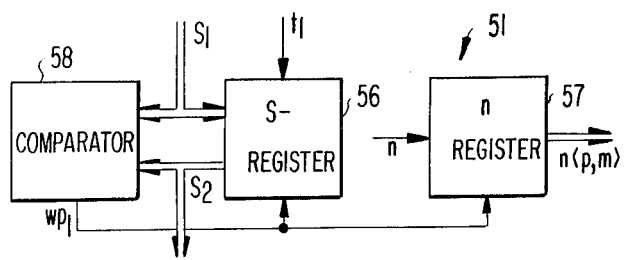

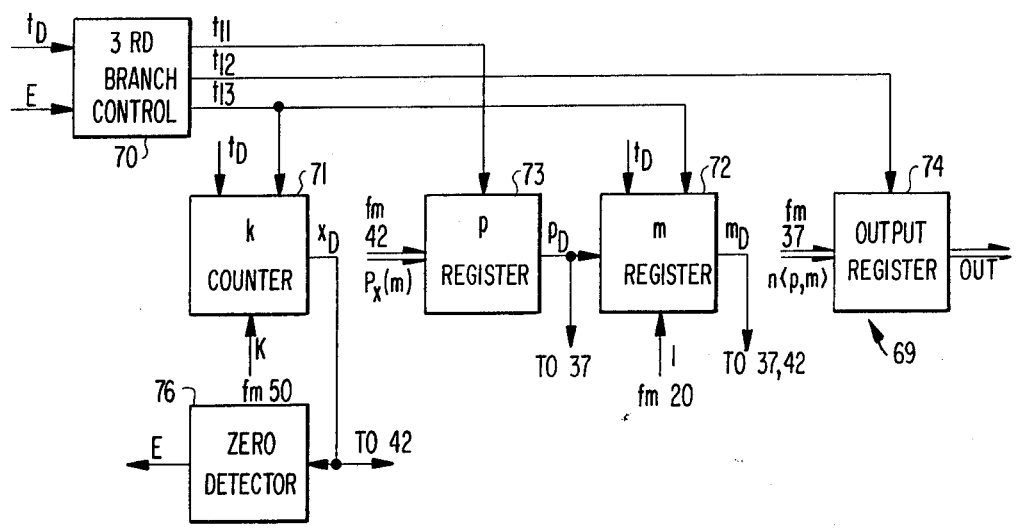

SYSTEM FOR RECOGNIZING SPEECH CONTINUOUSLY SPOKEN WITH NUMBER OF WORD OR WORDS PRESELECTED

BACKGROUND OF THE INVENTION

This invention relates to a continuous speech recognition system for automatically recognizing continuous speech, namely, continuously spoken one or more words.

A continuous speech recognition system has various merits as a device for supplying data and/or programs to an electronic digital computer and a device for supplying control data to various apparatus. Speech recognition has been approached in various ways. The simplest and most effective way is to resort to pattern matching. According to the pattern matching applied to recognition of a single word, standard or reference patterns are provided, one for each word of a vocabulary to be recognized. Comparison is made beween an unknown pattern of an input speech or voice signal (briefly called an input pattern) and each reference pattern to derive a quantity representative of a degree of similarity or a similarity measure between the two compared patterns. The input pattern is recognized to be the reference pattern that provides a maximum of the similarity measured calculated for the respective reference patterns. The pattern matching, however, is not directly applicable to recognition of continuous speech. This is because it is difficult prior to recognition of the respective words to optimally segment the continuous speech into word units, namely, to decide a point of segmentation between each pair of two consecutive words as, for example, by detecting variations in amplitude and/or pitch of the speech.

A pattern recognition system applicable to recognition of continuous speech is revealed in U.S. Pat. No. 3,816,722 issued to Hiroaki SAKOE, the present applicant, and Seibi CHIBA. An improvement in the continuous speech recognition system is described in a prior patent application filed by the instant applicant (Ser. No. 665,759 filed Mar. 11, 1976, now abandoned, in the United States; Application No. 1,009 of 1976 in the United Kingdom; No. P 26 10 439.2 in Germany; and Application No. 7602579 in the Netherlands). According to the prior patent application, pattern matching is carried out between an input pattern as a whole and concatenated reference patterns obtained by concatenation of the reference patterns in all possible permutations with repetition allowed. Decision is carried out by finding those number of words and concatenations of the reference patterns which render the similarity measure maximum as a whole. With this sytem, it is unnecessary to preliminarily segment the input pattern into word units. In practice, the maximum is found in two steps, one on the word basis and the other for the whole. It is possible to apply dynamic programming in finding out each maximum to achieve a practical speed of recognition. Although quite effective, the system according to the prior patent application is still defective in that the system is liable in specific cases to misrecognize the number of words and consequently misrecognize the whole input pattern. For example, an input pattern of two words might be misrecognized to be a pattern of three words and vice versa.

SUMMARY OF THE INVENTION

It is therefore an object of the present invention to provide a continuous speech recognition system capable of recognizing an input pattern of one or more words without the liability of misrecognizing the number of words.

It is another object of this invention to provide a continuous speech recognition system of the type described, which is correctly operable with least possible inconvenience caused to users.

This invention is based on the fact that misrecognition of the number of words is mostly restricted to an insertion or an omission error of only one word and hardly over results in an error of two or more words. Means is therefore provided according to a first aspect of this invention disclosed in Japanese Patent Application No. Syô 50-132004 filed Oct. 31, 1975, for specifying the number of words of an input pattern. The specified or preselected number may manually or otherwise be adjusted. According to a second aspect of this invention revealed in Japanese Patent Application No. Syô 51-18346 filed Feb. 20, 1976, means is provided for specifying by a finite sequence of different numbers the number of words allowable for an input pattern.

A continuous speech recognition system comprises in general an input pattern buffer memory for temporarily memorizing an input pattern A represented by a time sequence of input pattern feature vectors $a_i$, I in number, as:

$$A = a_1, a_2, \ldots, a_i, \ldots, a_I,$$

and a reference pattern memory for memorizing reference patterns $B^n$ representative of a predetermined number of words $n$. Like the input pattern, each reference pattern is represented by a time sequence of reference pattern feature vectors $b_j^n$, $J^n$ in number, as:

$$B^n = b_1^n, b_2^n, \ldots, b_j^n, \ldots, b_{J^n}^n.$$

The input pattern represents a certain number $\hat{k}$ of words, which number $\hat{k}$ may be equal to unity. The system further comprises means responsive to the input and reference pattern feature vectors for recognizing the input pattern to be a concatenation of selected one or ones of the reference patterns, $\hat{k}$ in number. In accordance with this invention, the above-mentioned recognizing means comprises a word number specifier for specifying the number K of the input pattern. The word number K is preselected for a predetermined duration to be equal at least to unity with reference to the above-mentioned number $\hat{k}$ of words of the input pattern. The above-mentioned means further comprises means responsive to the word number K and the input and reference pattern feature vectors for deciding the reference pattern concatenation.

BRIEF DESCRIPTION OF THE DRAWING

FIG. 3 is a block diagram of an example of a comparator, as called herein, for use in a system according to this invention;

FIG. 4 is a block diagram of an example of a second matching unit, as named herein, for use in a system according to this invention;

FIG. 5 is a block diagram exemplifying a third matching unit for use in a system according to the first embodiment;

FIG. 6 is a block diagram exemplifying a decision unit for use in a system according to the first embodiment;

FIG. 8 is a block diagram of an example of a maximum selector for use in a system according to this invention;

FIG. 10 is a block diagram of an example of a decision unit for use in a system according to the second embodiment; and FIG. 11 is a time chart of signals used in the decision unit illustrated in FIG. 10.

DESCRIPTION OF THE PREFERRED EMBODIMENT

Figure 1:
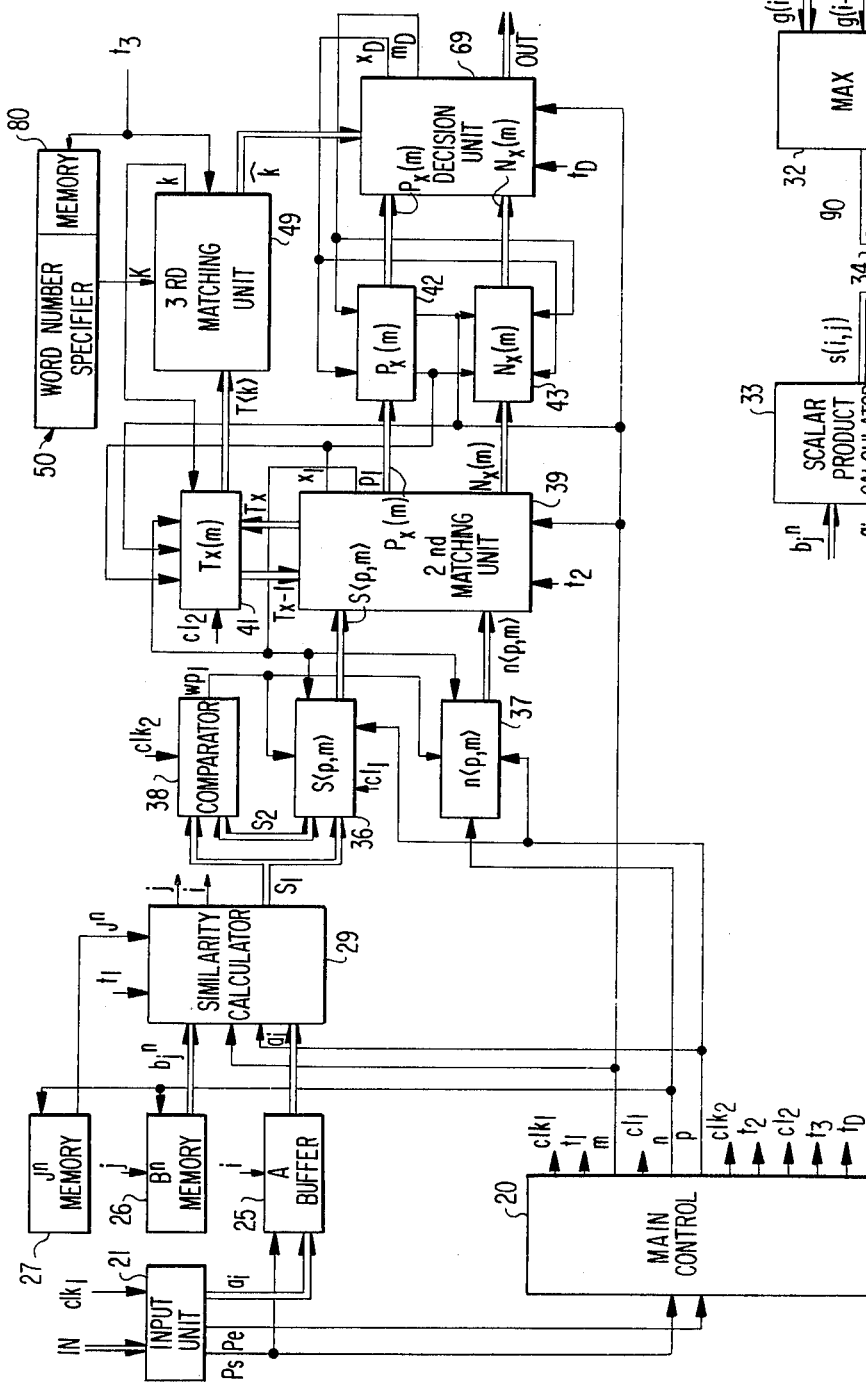
FIG. 1 is a block diagram of a continuous speech recognition system according to a first embodiment of the present invention.

Before describing a few continuous speech recognition systems according to the preferred embodiments of the present invention with reference to figures of the accompanying drawing, principles of this invention will be described in the following for a better understanding thereof. Let an input pattern A of an input speech or voice signal be represented by a time sequence of input pattern feature vectors $a_i$ by:

$$A = a_1, a_2, \ldots, a_i, \ldots, a_I,$$

where $I$ represents the number of feature vectors of the input pattern A as well as the duration of the speech signal and will be called an input pattern duration. As is known in the art, each feature vector is representative at an instant $i$ of features of the speech or voice and may be given by:

$$a_i = (a_{i1}, a_{i2}, \ldots, a_{iq}, \ldots, a_{iQ}),$$

where the vector components are given by a plurality of signals, Q in number. Likewise, reference patterns $B^n$ of preselected words $n$ are represented by time sequences, $n$ in number, of reference pattern feature vectors $b_j^n$ as:

$$B^n = b_1^n, b_2^n, \ldots, b_j^n, \ldots, b_{J^n}^n,$$

where $J^n$ (written in the above equation in a simplified manner) represents a reference pattern duration of each reference pattern. Each reference pattern feature vector is given by:

$$b_j^n = (b_{j1}^n, b_{j2}^n, \ldots, b_{jq}^n, \ldots, b_{jQ}^n),$$

as is the case with each input pattern feature vector. Inasmuch as similar operation is usually repeated for the respective reference patters $B^n$, the affix n will often be omitted in the following.

Let a similarity measure between an input pattern A and a reference pattern B be represented by S[A, B] in general and the words $n$ dealt with be restricted to spoken numerals merely for simplicity of nomenclature. A permutation, with repetition, of reference patterns for numerals $n(1), n(2), \ldots, n(x), \ldots,$ and $n(k)$, $k$ in number, is herein called a k-digit concatenated reference pattern $\bar{B}$. The pattern $\bar{B}$ is represented by:

$$\bar{B} = B^{n(1)} \oplus B^{n(2)} \oplus \ldots \oplus B^{n(x)} \oplus \ldots B^{n(k)},$$

where the operator $\oplus$ represents concatenation of patterns. A pattern $B^n \oplus B^m$ is defined by:

$$B^n \oplus B^m = b_1^n, b_2^n, \ldots, b_{J^n}^n, b_1^m, b_2^m, \ldots, b_{J^m}^m.$$

According to the second aspect of this invention summarized hereinabove, the number $k$ of digits of an input pattern A is restricted to one specified or preselected by a finite sequence of different integers. In an example of the second aspect to be described below, the number $k$ is specified by:

$$k \in \{1, 3, 5, 7\}, \quad (1)$$

as one included in a sequence of four odd integers 1, 3, 5, and 7. A system according to the example of the second aspect recognizes the input pattern A to be a continuously spoken numeral of that number of digit which is equal to one of the four specified odd integers 1, 3, 5, and 7. This removes the liability of misrecognizing, for example, a three-digit numeral to be a two or four-digit numeral. Despite the restriction exemplified by Equation (1), it is possible to recognize a spoken numeral of an unspecified or unselected number of digits by speaking the numeral as a numeral of one of the preselected digit numbers. For instance, "2981" may be spoken as a five-digit numeral "02981" without changing the meaning. The restriction is therefore not serious in practice.

A continuous speech recognition system according to the second aspect of this invention finds out those optimum number of $k$ of digits and optimum permutation $n(1), n(2), \ldots, n(x), \ldots,$ and $n(k)$ of numerals n which maximize the similarity measures between the input pattern A and all k-digit concatenated reference patterns $\bar{B}$, whereby the input pattern A is recognized to represent continuously spoken numerals $n(1), n(2), \ldots,$ and $n(\hat{k})$. In other words, a system according to the example of the second aspect decides the optimum number of digits and the optimum concatenation of reference patterns by solving for an input pattern A a maximization problem:

$$\max_{\substack{n(1), n(2), \ldots, n(k) \\ k \in \{1, 3, 5, 7\}}} [S[A, \bar{B}]]. \quad (2)$$

For simplicity of description, let the number of reference patterns $B^n$ be 10 and the maximization problem be solved according to the first aspect of this invention, briefly described hereinabove, where the maximum is decided only for various permutations $n(1), n(2), \ldots, n(x), \ldots,$ and $n(k)$ of a specified number $k$ of digits. Even in this case, the number of different k-digit concatenated reference patterns $\bar{B}$ amounts to $_{10}\pi_k = 10^k$. It is therefore difficult to calculate the similarity measures $S[A, \bar{B}]$ within a short time.

In order to efficiently find out the maximum defined by Formula (2), a partial pattern $A(p, m)$ of an input pattern A is defined by:

$$A(p, m) = a_{p+1}, a_{p+2}, \ldots, a_m,$$

starting, among all instants $i$ for the input pattern feature vectors, at $p + 1$ and ending at $m$. The instants $p$ and $m$ will be called start and end points of the partial pattern $A(p, m)$. Naturally, $p$ is less than $m$. Let an input pattern A be divided at instants $p(1), p(2), \ldots, p(x), \ldots,$ and $p(k-1)$, $k - 1$ in number, into $k$ partial patterns without overlap. The input pattern A is now given by:

$$A = A(p(0), p(1)) \oplus A(p(1), p(2)) \oplus \ldots \\ \oplus A(p(x - 1), p(x)) \oplus \ldots \oplus A(p(k - 1), p(k)),$$

as a k-digit concatenated partial pattern. The instants $p(x)$ will be named segmenation points, where $p(0)$ and $p(k)$ are 1 and I. If the similarity measure S[A, B] is transformable in such a manner that:

$$S[A, B] = S[A(p(O), p(1)) \oplus A(p(1), p(2)) \oplus \ldots \\ \oplus A(p(x - 1), p(x)) \oplus \ldots \oplus A(p(k - 1), p(k)), \\ B^{n(1)} \oplus B^{n(2)} \oplus \ldots \oplus B^{n(x)} \oplus \ldots \oplus B^{n(k)}] \\ = \sum_{x=1}^{k} S[A(p(x - 1), p(x)), B^{n(x)}],$$

then it is necessary and sufficient to calculate:

$$\max_{\substack{n(1), n(2), \ldots, n(k) \\ p(1), p(2), \ldots, p(k-1) \\ k \in \{1, 3, 5, 7\}}} [\sum_{x=1}^{k} S[A(p(x - 1), p(x)), B^{n(x)}]], \tag{3}$$

instead of Formula (2). Next, Formula (3) is divided into maximization according to $n(x)$, that according to $p(x)$, and that according to $k$. The result of the division is:

$$\max_{k \in \{1, 3, 5, 7\}} [\max_{p(1), p(2), \ldots, p(k-1)} [\sum_{x=1}^{k} \max_{\substack{n(x) \\ p(x))}} [S[A(p(x - 1), p(x)), B^{n(x)}]]]]. \tag{4}$$

A continuous speech recognition system according to the example of the second aspect carries out the maximization defined by Formula (3) in three steps in compliance with Formula (4) starting at the innermost maximization successively to the outermost maximization. The step for the innermost maximization with respect to $n(x)$ will be called a first matching step. The step of the middle maximization as regards $p(x)$ is herein called a second matching step. The step of the outermost maximization relative to $k$ is likewise called a thirdmatching step. Finally, optimum parameters, namely, the optimum number $k$ of digits and the optimum concatenation of reference patterns are decided with reference to Equation (1). The final step will be called a decision step. Prior to the first matching step, an input pattern A is introduced into the system. The step therefor will be called a preliminary step. As will become clear when systems according to the preferred embodiments are described, the preliminary step may be carried out simultaneously with the first and second matching steps.

During the first matching step, the start and end points $p(x - 1)$ and $p(x)$ of the respective partial patterns $A(p(x - 1), p(x))$ are still indefinite except the start and end points $p(0)$ and $p(k)$ of the whole input pattern A. The similarity measures $S[A(p(x - 1), p(x)), B^{n(x)}]$ are therefore calculated between each of the partial patterns $A(p, m)$ having possible combinations $(p, m)$ of the start and end points and all reference patterns $B^n$. The symbol $m$ has no connection with the same symbol used in defining a concatenated pattern. Maximation is carried out to find:

$$S<p, m> = {}_n^{max}[S[A(p, m), B^n]] \tag{5}$$

and $$n<p, m> = arg \, {}_n^{max}[S[A(p, m), B^n]] \tag{6}$$

where the operator $arg_n{}^{max}$ is to find an optimum reference pattern B that gives a maximum of the similarity measures between each partial pattern $A(p, m)$ and the reference patterns $B^n$. The results given by Equations (5) and (6) are the maximum similarity measure between one of the partial patterns and all reference patterns and the reference pattern that gives the maximum similarity measure and will be named a partial similarity measure and a partial recognition result.

Merely for conveniently carrying out the first matching step, it is assumed here that a similarity measure $S[A(p, m), B]$ between a partial pattern $A(p, m)$ and a reference pattern B is now defined more specifically by:

$$S[A(p, m), B] = \max_{j(i)} [\sum_{i=p+1}^{m} s(i, j)]. \tag{7}$$

where $s(i, j)$ represents a scalar product of one each of the input and reference pattern feature vectors $a_i$ and $b_j$, namely:

$$s(i, j) = \sum_{q=1}^{Q} (a_{iq} b_{jq}),$$

where $j$ is varied in compliance with a monotonously increasing continuous function of $i$ between 1 and $J$ so that:

$$j(p + 1) = 1$$

and $$j(m) = J,$$

as described in an article contributed by Hiroaki SAKOE and Seibi CHIBA, assignors of the above-referenced United States Patent to Nippon Electric Co., Ltd., to "Nippon Onkyô Gakkai-si (The Journal of Acoustical Society of Japan)," Vol. 28, No. 9 (September 1971), pages 483–490, under the title of "Dôteki Keikakuhô o riyôsita Onsei no Zikan Seikika ni motozuku Renzoku Tango Kinsiki (Recognition of Continuously Spoken Words Based on Time Normalization by Dynamic Programming)." With reference to this article, maximization of Equation (7) is carried out by resorting to dynamic programming. More particularly, reference coefficients, named as in the cited United States Patent, are calculated by the use of a recurrence formula:

$$g(i, j) = s(i, j) + \max \begin{bmatrix} g(i + 1, j) \\ g(i + 1, j + 1) \\ g(i + 1, j + 2) \end{bmatrix}, \tag{8}$$

successively for $j = J - 1, J - 2, \ldots, 2$, and 1, starting at initial recurrence coefficients given for $j = J$ by a set of initial conditions:

$$g(m, J) = s(m, J) \quad \text{for } i = m$$

and $$g(i, J) = 0 \quad \text{for } i \neq m \text{ and } m - r \leq i \leq m + r,$$

where $r$ represents a preselected constant. Like the restriction imposed on $i$ by the initial conditions, it is sufficient to calculate Equation (8) for other values of $j$ under a restriction such that:

$$m - J - r + j \leq i \leq m - J + r + j,$$

when the constant r is preselected to be equal to about 30°/o of the shortest one, $_n\min[J^n]$, of the reference durations J as described in the referenced United States Patent. As an eventual result of calculation of Equation (8), the similarity measure defined by Equation (7) is given by an ultimate recurrence coefficient $g(p + 1, 1)$ as:

$$S[A(p, m), B] = g(p + 1, 1).$$

In the second matching step, a summation of partial similarity measures $S<p, m>$ is calculated at first for each $k$-digit concatenated partial pattern. Next, maximization of the summations is carried out for all possible sets of segmentation points $p(1), p(2), \ldots, p(x), \ldots,$ and $p(k - 1)$. It should be noted that the number $k$ of digits is not yet decided prior to the second matching step. The maximization asregards the segmentation points therefore includes maximization with respect to the number $k$ of digits among 1 through 7 regardless for the present of Equation (1). In other words, the maximization of the second matching step is to calculate for each number $k$ of digits:

$$T<k> = \max_{p(1), p(2), \ldots, p(k-1)} [\sum_{x=1}^{k} S<p(x-1), p(x)>], \quad (9)$$

which is herein called an overall similarity measure for the digit number $k$. Inasmuch as the argument enclosed within the brackets in Equation (9) is given as a summation, it is possible on calculating the overall similarity measure to resort again to dynamic programming.

Let it be presumed here for resorting to dynamic programming that a partial pattern $A(l, m)$ is further divided into partial patterns, $k$ in number. When the segmentation points $p(1), p(2), \ldots, p(x), \ldots,$ and $p(k - 1)$ are optimally decided, the summation of the partial similarity measures $S<p(x - 1), p(x)>$ is maximized. In other words, let a recurrence value $T_k(m)$, herein called, be defined by:

$$T_k(m) = \max_{p(1), p(2), \ldots, p(k-1)} [\sum_{x=1}^{k} S<p(x-1), p(x)>], \quad (10)$$

which is calculable by the use of a second recurrence formula:

$$T_x(m) = \max_{p<m}[S<p, m> + T_{x-1}(p)], \quad (11)$$

for $x = 1$ through 7 and $m = 1$ through I. The calculation should start at a set of initial conditions:

$$T_x(m) = 0,$$

for $x = 1$ through 7 and $m = 1$ through I. The calculation results in ultimate recurrence values $T_k(I)$ for $k = 1$ through 7, which are equal to maxima for the respective numbers $k = 1, 2, \ldots,$ and 7 of the summations of partial similarity measures $S<p(x - 1), p(x)>$, $k$ in number, for the partial patterns $A(p, m)$ into which the whole input pattern A is divided at optimum segmentation points $p(1), p(2), \ldots,$ and $p(k - 1)$. In other words, the ultimate recurrence values $T_k(I)$ give the results of maximization of Equation (9) for $k = 1$ through 7.

In practice, it is necessary to determine not only the overall similarity measures $T<k>$ but also the optimum segmentation points $p(1), p(2), \ldots,$ and $p(k - 1)$ and partial recognition results $n<p(0), p(1)>$, $n<p(1), p(2)>, \ldots, n<p(x - 1), p(x)>, \ldots,$ and $n<p(k - 1), p(k)>$ for the optimum segmentation points. Therefore:

$$P_x(m) = \arg \max_{p<m}[S<p, m> + T_{x-1}(p)] \quad (12)$$

and $$N_x(m) = n<P_x(m), m> \quad (13)$$

are calculated along with calculation of Equation (10) or (11). The quantity defined by Equation (12) gives a start point $p$, for each value of $k$, of an optimum partial pattern $A(p, m)$ that has an end point provisionally fixed at $m$ and maximizes the quantity enclosed with the brackets under the condition such that $p$ is less than $m$. The quantity given by Equation (13) represents an optimum result of recognition, for each value of $k$, of a partial pattern $A(P_x(m), m)$ having start and end points previsionally set at $P_x(m)$ and $m$. The quantities will therefore be named a provisional segmentation point and a provisional recognition result.

The third matching step is to find a maximum of the overall similarity measures $T<k>$ for $k = 1, 3, 5,$ and 7, namely:

$$\max_{k \in \{1, 3, 5, 7\}} [T<k>], \quad (14)$$

among the overall similarity measures $T<k>$ calculated for $k = 1$ through 7 during the second matching step. In practice, it is necessary to find out an optimum number $k$ of digits that gives the maximum overall similarity measure according to Formula (14), namely;

$$\hat{k} = \arg \max_{k \in \{1, 3, 5, 7\}} [T<k>], \quad (15)$$

rather than to find out the maximum overall similarity measure.

Finally in the decision step, a whole recognition result is decided with reference to the provisional segmentation points and recognition results $P_x(m)$ and $N_x(m)$ obtained by Equations (12) and (13) and to the optimum number $\hat{K}$ of digits given by Equation (15). The provisional recognition result $N_{\hat{k}}(I)$ for $k = \hat{k}$ and $m = I$ gives the result of recognition of a partial pattern $A(P_{\hat{k}}(I), I)$. Consequently, the numeral $n(\hat{k})$ of the $\hat{k}$-th or least significant digit of the input pattern A is decided to be $N_{\hat{k}}(I)$. The start point $p(\hat{k} - 1)$ of the partial pattern for the numeral $n(\hat{k})$ is decided to be $p_{\hat{k}}(I)$, which is the end point of the partial pattern for the numeral $n(\hat{k} - 1)$ standing at the $(\hat{k} - 1)$-th digit, namely, one digit more significant than the least significant digit. Therefore, the last-mentioned numeral $n(\hat{k} - 1)$ is decided to be $N_{\hat{k}-1}(p(\hat{k} - 1))$. The start point for this numeral $n(\hat{k} - 1)$ is decided to be $P_{\hat{k}-1}(p(\hat{k} - 1))$. In this manner, the ultimate results of recoginition of partial patterns, $\hat{k}$ in number, are decided down to $x = 1$, whereby the whole ultimate result of recognition is obtained.

For the first aspect of this invention summarized hereinabove and temporarily referred to during description of an example of the second aspect, the number $k$ of digits of an input pattern A is given by a specified or preselected integer. It is therefore unnecessary for a system according to the first aspect to find the maxima for $k$ in Formulae (2) through (4). In the second matching step, maximization of Equation (9) is carried out for the segmentation points alone because the number $k$ is already preselected. Equation (11) is calculated for the specific number $k$ of digits rather than for all possible numbers, such as 1 through 7, of digits. The third matching step is unnecessary. When Equations (11) and (12) are calculated in the second matching step up to $x = k$ and $m = I$, the start point $p(k - 1)$ of the partial pattern for the numeral $n(k)$ of the $k$-th or least significant digit is decided to be $P_k(I)$. The numeral $n(k)$ is decided to be $n < P_k(I), I >$. The start point $p(k - 2)$ of the partial pattern for the numeral $n(k - 1)$ of the $(k - 1)$-th digit is $P_{k-1}(p(k - 1))$. The numeral $n(k - 1)$ is decided to be $n < P_{k-1}(p(k - 1), p(k - 1)>$. In this manner, the ultimate results of recognition of the numerals, $k$ in number, are successively decided down to $x = 1$.

Referring now to FIG. 1, a continuous speech recognition system according to a first embodiment of this invention is shown for putting the above-described second aspect of this invention into effect and comprises a main control unit 20 for producing various control pulses and signals, described later, to control other units and elements of the system. In the above-mentioned preliminary step, a comparator (not shown) of an input unit 21 compares the amplitude level of an input speech or voice signal IN of a certain input pattern A with a preselected threshold level to produce speech start and end pulses $P_s$ and $P_e$ at substantial beginning and end of the speech signal IN. An interval between the pulses $P_s$ and $P_e$ is equal to an input pattern duration I of the input pattern A. Responsive to the start pulse $P_s$, the control unit 20 produces first clock pulses $clk_1$ at a repetition period of about 20 ms until appearance of the end pulse $P_e$. Supplied with the speech signal IN and the first clock pulses $clk_1$, the input unit 21 successively produces input pattern digital signals $a_i$ representative of feature vectors $a_i$ of the input pattern A. More particularly, each digital signal consists of multiplexed component signals representative of vector components $a_{iq}$ of the feature vector $a_i$. In this respect, the input unit 21 may be that described in the above-cited United States Patent with reference to FIG. 11 thereof. For brevity, the input pattern digital signals and similar signals will often be called by the name of the quantities they represent. Furthermore, no confusion will arise although the signals are designated in the following either by like reference characters as the quantities, such as $a_i$ for $a_i$, or even by the same reference characters. Responsive to the speech start pulse $P_s$, an input pattern buffer memory 25 is successively loaded with the input pattern feature vectors $a_i$ being produced by the input unit 21. A reference pattern memory 26 is preliminarily loaded with feature vectors $b_j^n$ of reference patterns $B^n$ representative of a predetermined number of numerals $n$. A reference duration memory 27 is also preliminarily loaded with reference durations $J^n$ of the respective reference patterns $B^n$.

Further referring to FIG. 1, the first matching step begins as soon as a sufficient number of the input pattern (feature) vectors $a_i$ are stored in the buffer memory 25. As will readily be understood, the sufficient number may be decided by $_n\min[J^n] - r$, where $r$ represents the preselected constant described hereinabove. The control unit 20 cyclically produces reference pattern signals $n$ in accordance with a prescribed program to specify the respective reference patterns $B^n$. Responsive to input pattern vector number signals $i$ successively produced in the manner later exemplified, the buffer memory 25 supplies the input pattern vectors $a_i$ to a similarity calculator 29. Responsive to each of the reference pattern signals $n$ currently produced by the control unit 20 and to reference pattern vector number signals $j$ successively produced in the meantime as will presently be exemplified, the reference pattern memory 26 supplies the reference pattern (feature) vectors $b_j$ of the specified reference pattern B to the calculator 29. Meanwhile, the reference duration memory 27 supplies in response to the current reference pattern signal $n$ the reference duration J of the specified reference pattern B to the calculator 29. Supplied from the control unit 20 with a first timing pulse $t_1$ indicative of start of the first matching step, the calculator 29 starts its operation to eventually produce, in the manner exemplified hereunder, first similarity signals $S_1$ representative of similarity measures $S[A(p, m), B]$ between partial patterns $A(p, m)$ of the input pattern A and the reference patterns B.

Figure 2:
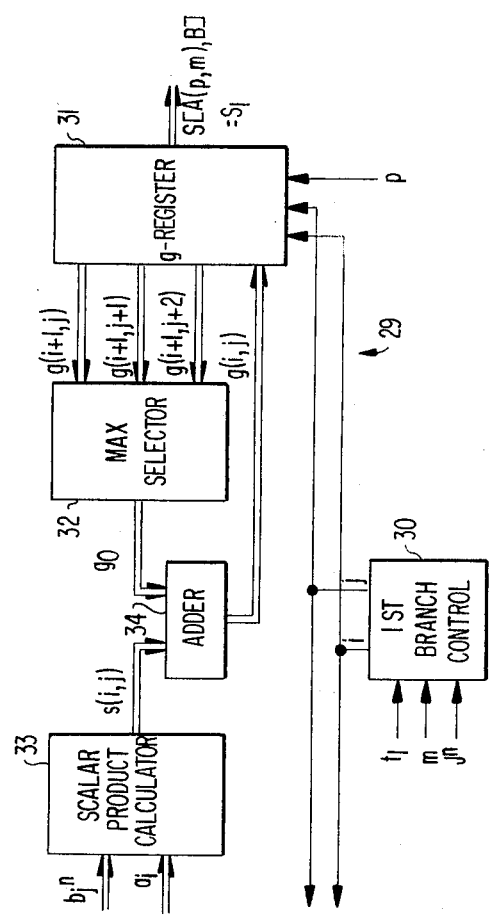
FIG. 2 is a block diagram of an example of a similarity measure calculator for use in a system according to this invention.

Referring to FIG. 2 for a short while, the main control unit 20 (FIG. 1) successively produces partial pattern end point signals $m$, one for each cycle of the reference pattern signals $n$, to specify end points $m$ of various partial patterns $A(p, m)$. A similarity calculator 29 for calculating the recurrence coefficients $g(i, j)$ defined by Equation (8) comprises a calculator or first branch control unit 30 responsive to the first timing pulse $t_1$ for successively producing the reference (pattern vector) number signals $j$ starting at an initial reference number signal represntative of the current reference duration J down to an ultimate reference number signal representative of unity and, for each reference number signal $j$, the input (pattern vector) number signals $i$ starting at an initial input number signal representative of $m - J + r + j$ down to an ultimate input number signal representative of $m - j - r + j$. The main control unit 20 is designed so as to produce another one of the first timing pulses $t_1$ and to change the reference pattern signal $n$ from one to another when the reference number signal $j$ is once varied from the initial reference number signal to the ultimate one. The calculator 29 further comprises a g-register 31 having memory locations specifiable by the input and reference number signals $i$ and $j$. Responsive to each initial reference number signal J, the initial recurrence coefficients $g(m, J)$ and $g(i, J)$ are stored in the known manner in the memory location specified by the number signals $m$ and J and in the memory locations specified by the number signals $i$ and J where $i$ is less than the end point $m$ and not less than $m - r$ and greater than $m$ and not greater than $m + r$. Responsive to a specific one each of the number signals $i$ and $j$, the $g$-register 31 supplies signals $g(i + 1, j)$, $g(i + 1, j + 1)$, and $g(i + 1, j + 2)$ to a maximum selector 32 for producing a maximum coefficient signal $g_0$ given by the second term of the right side of Equation (8). Supplied with the input and reference vectors $a_i$ and $b_j$ specified by the specific number signals $i$ and $j$ from the memories 25 and 26, a scalar product calculator 33 produces a scalar product $s(i, j)$ used in Equation (7). A first adder 34 calculates the recurrence coefficient $g(i, j)$, which is stored in the $g$-register 31 at the memory location specified by the specific number signals $i$ and $j$. The maxium selector 32 and scaler product calculator 33 may be those described in the cited United States Patent with reference to FIGS. 6 and 5, respectively, thereof.

Further referring to FIG. 2, let the reference number signal $j$ be eventually varied to the ultimate reference number signal and let the input number signal $i$ be varied, during presence of the ultimate reference number signal, from the initial input number signal successively to the ultimate one. In the meantime, recurrence coefficients $g(i, j)$ are calculated for possible values of $i$ within a range:

$$m - J - r + 1 \leq i \leq m - J + r + 1,$$

and stored in the $g$-register 31. These recurrence coefficients $g(i, 1)$ give similarity measures $S[A(p, m), B]$ between partial patterns $A(p, m)$ having the current end point $m$ in common and their start points at possible start point $p$ given by:

$$m - r - J \leq p \leq m + r - J, \tag{16}$$

and the current reference pattern B. The main control unit 20 successively produces partial pattern start point signals $p$ within the range given by Equation(16) for various partial patterns $A(p, m)$ having the current end point $m$. Supplied with each start point signal $p$, the $g$-register 31 produces a first similarity measure signal $S_1$ representative of $g(p + 1, 1)$ for the current reference pattern B, namely, a similarity measure between the current reference pattern B and a partial pattern $A(p, m)$ having the specified start point $p$ and the current end point $m$, from the memory location specified by the start point signal $p$ and the current end point signal $m$.

Referring again to FIG. 1 and also to FIG. 3, the system comprises partial similarity measure and recognition result tables or registers 36 and 37 with which the similarity calculator 29 and a first comparator 38 cooperate as a first matchng unit for putting the first matching step into effect. The tables 36 and 37 have addresses specifiable by the start point signals $p$ and store partial similarity measures and recognition results $S<p, m>$ and $n<p, m>$ decided in compliance with Equations (5) and (6) in the manner shortly described. Responsive to each start point signal $p$, the partial similarity measure table 36 produces a second similarity measure signal $S_2$ representative of the partial similarity measure $S<p, m>$. The main control unit 20 produces second clock pulses $clk_2$ in synchronism with the start point signals $p$. The comparator 38, as called herein, successively compares the first similarity signals $S_1$ with the second ones $S_2$ to supply those second clock pulses $clk_2$ as first write-in pulses $wp_1$ to the partial similarity measure and recognition result tables 36 and 37 which are produces when $S_1 > S_2$. The comparator 38 may comprise a subtractor 381 for subtracting the first similarity measure signal $S_1$ from the second one $S_2$ to produce a subtraction signal $S_b$, which is the sign bit of the difference $S_2 - S_1$ and becomes a logic 1 signal when $S_1 > S_2$, and an AND gate 382 enabled by the difference signal $S_b$ to deliver the second clock pulses $clk_2$ to the tables 36 and 37 as the write-in pulses $wp_1$ only when $S_1 > S_2$. The main control unit 20 further produces a first clear signal $cl_1$ to clear the partial similarity measure table 36 each time when the end point signal $m$ is varied from one to another. Responsive to the following start point signals $p$, the write-in pulses $wp_1$ are produced to store that similarity measure $S[A(p, m), B]$ at the address of the table 36 specified by the current start point signal $p$ which is greater than the similarity measure previously stored in the address $p$. When the reference pattern signal $n$ is varied throughout one cycle and when the start point signal $p$ is varied for each reference pattern signal $n$ throughout the possible start points defined by Equation (16), the partial similarity measures $S<p, m>$ are calculated in compliance with Equation (5) and stored in the addresses specified by the start point signals $p$. Similarly, the reference pattern signals n supplied from the main control unit 20 are stored in the partial recognition result table 37 by the write-in pulse $wp_1$ as the partial recognition results $n<p, m>$ for the possible start points $p$ at the addresses specified by the start point signals $p$.

Referring to FIG. 1 once again and newly to FIG. 4, the main control unit 20 supplies a second timing pulse $t_2$ for starting the second matching step to a second matching unit 39 at the beginning of each end point signal $m$, when the partial similarity measures and recognition results $S<p, m>$ and $n<p, m>$ are calculated for a specific or previous one of the end points $m$. A second matching unit 39 exemplified in FIG. 4 comprises a second matching or branch control unit 40 comprising, in turn, an $x$-counter and a $p$-counter (not shown). Each second timing pulse $t_2$ puts a count of unity in the $x$-counter, which count is subsequently increased one by 1 up to 7, the greatest of the possible allowable and unspecified numbers of digits, before appearance of the next following one of the second timing pulses $t_2$. The $x$-counter thus produces a first local digit number signal $x_1$ specifying the number $x$ of digits for Equations (11) through (13). The $p$-counter successively produces first local start point signals $p_1$ in the manner desribed hereunder. The second matching unit 39 in general cooperates with the partial similarity measure and recognition result tables 36 and 37, a recurrence value table or register 41, and provisional segmentation point and recognition result tables or registers 42 and 43 to calculate Equations (11) through (13) for the respective end points $m$ of the partial patterns $A(p, m)$. The newly-mentioned tables 41-43 are for storing the recurrence values $T_x(m)$ and the provisional segmentation points and recognition results $P_x(m)$ and $N_x(m)$ in the manner later exemplified in detail. Each of these tables 41-43 has addresses specifiable by the end point and digit number signals $m$ and $x_1$. The local start point signals $p_1$ may be used in place of the end point signals $m$ to specify the addresses. Responsive to the speech start pulse $P_s$, the main control unit 20 supplies a second clear pulse $cl_2$ to the recurrence value table 41 to clear the same and to thereby set therein the initial conditions for the recurrence formula (11). The exemplified second matching unit 39 further comprises T-register, $p$-register, and $n$-register 451, 452, and 453, respectively, a second adder 47, and a second comparator 48.

Referring more specifically to FIG. 4, let it now be presumed that a specific one of the possible or allowable and unspecified digit numbers $x$ is set in the $x$-counter. The second matching control unit 40 produces a third clear pulse $cl_3$ to clear the T-register 451 and sets in the $p$-counter a count representative of an initial possible start point $P_1$ given by:

$$P_1 = m - {}_n\max[J^n] - r,$$

which count is subsequently increased one by one up to an ultimate possible start point $P_2$ defined as:

$$P_2 = m - {}_n\min[J^n] + r,$$

where the value $m$ is given by the current end point signal $m$ and other values are preliminarily known. The counts seccessively set in the $p$-counter thus provide a sum-set or union of those start points $p$ of partial patterns $A(p, m)$ having the specific end point $m$ in common which are determined in consideration of the reference durations $J^n$. The local start point signals $p_1$ are representative of the counts set in the $p$-counter and supplied to the $p$-register 452. These signals $p_1$ are also used in specifying the addresses of the partial similarity measure and recognition result tables 36 and 37 (FIG. 1) to successively supply the partial similarity measures and recogniton results $S<p, m>$ and $n<p, m>$ to the second adder 47 and $n$-register 453, respectively, and in specifying the addresses of the recurrence value table 41 (FIG. 1) to successively supply the adder 47 with previous recurrence values $T_{x-1}(p)$ used in Equation (11). It may be that the values $x - 1$ and/or $p$ are equal to zero or less when numbers specified by the current digit number signal $x_1$ and/or the local start point signals $p_1$ are still small. Under the circumstanes, zeroes are read out of the recurrence value table 41. The adder 47 thus calculates the argument of the operator max in the recurrence formula (11) to produce a first recurrence value signal $T_1$ representative of the argument. The T-register 451 produces a second reucrrence value signal $T_2$ representative of that content thereof which is zero at first and varied in the manner presently clarified. The second comparator 48 is similar in structure to the first one 38 and compares the first and second recurrence value signals $T_1$ and $T_2$ to supply the sign bit signal of the difference therebetween as a second write-in pulse $wp_2$ to the registers 451–453 only when $T_1 > T_2$. It will now be understood that the registers 451–453 are loaded with a recurrence value $T_x(m)$, a provisional segmentation point $P_x(m)$, and a provisional recognition result $N_x(m)$ calculated throughout the local start point signals $p_1$ for the specific end point and digit number signals $m$ and $x_1$. These contents of the registers 451–453 are transferred to the respective tables 41–43. After the local start point signal $p_1$ is varied from its initial value $P_1$ to its ultimate value $P_2$, the count in the $x$-counter is increased by one.

It is to be noted that the first matching step for each of the end point signals m is completed when the reference pattern signal $n$ is varied throughout one cycle. In the meantime, the second matching step for the current end point signal $m$ may be carried through with the digit number signals $x_1$ varied from unity up to the greatest possible number of digits. The speech end pulse $P_e$ is eventually produced, when the end point signal $m$ may become an ultimate end point signal I representative of the input pattern duration I. The recurrence values $Tx(m)$ calculated at this instant are the ultimate recurrence values $T_x(I)$, namely, the overall or whole similarity measures $T<x>$ for $x = 1$ through 7. The main control unit 20 now supplies a third timing pulse $t_3$ to a third matching unit 49 and continually produces the ultimate end point signal I. The third matching step and the subsequently executed decision step will later be described with reference to FIGS. 1, 5, and 6.

Figure 7:
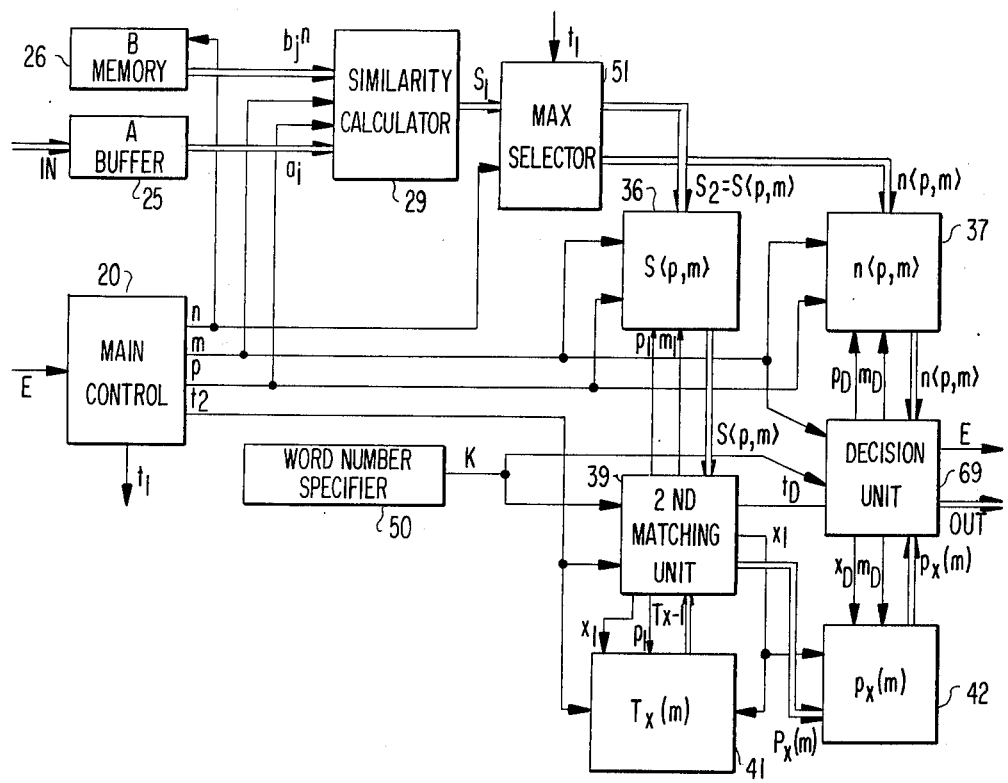
FIG. 7 is a block diagram of a continuous speech recognition system according to a second embodiment of this invention.

Turning to FIG. 7, a continuous speech recognition system according to a second embodiment of this invention is for putting its first aspect into effect and compriss a main control unit 20, an input pattern buffer memory 25, a reference pattern memory 26, a similarity calculator 29, partial similarity measure and recognition result tables 36 and 37, a second matching unit 39, a recurrence value table 41, and a provisional segmentation point table 42, all similar to the corresponding units and elements illustrated with reference to FIG. 1. The similarity calculator 29 may be similar to that described either hereinabove with reference to FIG. 2 or in the referenced United States Patent with reference to FIG. 8 thereof. It is assumed here that the similarity calculator 29 calculates the similarity measures $S[A(p, m), B^n]$ between a partial pattern $A(p, m)$ specified by a pair of start and end point signals $p$ and $m$ and the reference patterns $B^n$ successively specified by the reference pattern signals $n$. The signals $p$, $m$, and $n$ are produced by the control unit 20. The system further comprises a digit number specifier 50, described later. for producing a digit number signal K specifying that number $k$ of digits whch is preselected in accordance with the first aspect for input patterns to be dealt with. Instead of the first comparator 38 exemplified with reference to FIG. 1, use is herein made of a maximum selector 51 for successively calculating the partial similarity measures and recognition results $S<p, m>$ and $n<p, m>$. For use in making the selector 51 carry out the first matching step, the control unit 20 produces a first timing pulse $t_1$ when at least one of the start and end point signal pair $p$ and $m$ is varied from one to another. Each of the partial similarity measure and recognition result tables 36 and 36 has addresses specifiable by the start and end point signals $p$ and $m$.

Referring temporarily to FIG. 8, the maximum selector 51 may comprise an S-register 56 and an $n$-register 57 to which first similarity measure signals $S_1$ representative of the similarity measures $S[A(p, m), B^n]$ and reference pattern signals n are successively applied. The S-register 56 is cleared by each first timing pulse $t_1$ and supplies a second similarity measure signal $S_2$ representative of its content to a comparator 58. Like the first comparator 38, the comparator 58 compares the first and second similarity measure signals $S_1$ and $S_2$ and supplies the sign bit signal of the difference therebetween to the registers 56 and 57 as a first write-in pulse $wp_1$, only when $S_1 > S_2$, to store in the respective registers 56 and 57 the first similarity measure and the reference pattern signals $S_1$ and $n$ applied thereto at the instant. The registers 56 and 57 thus hold the partial similarity measure and recognition result $S<p, m>$ and $n<p, m>$ calculated for each partial pattern $A(p, m)$ and the reference patterns $B^n$. The partial similarity measure and recognition result $S<p, m>$ and $n<p, m>$ are delivered to the respective tables 36 and 37 to be stored therein at the addresses specified by the start and end point signals $p$ and $m$.

Figure 9:
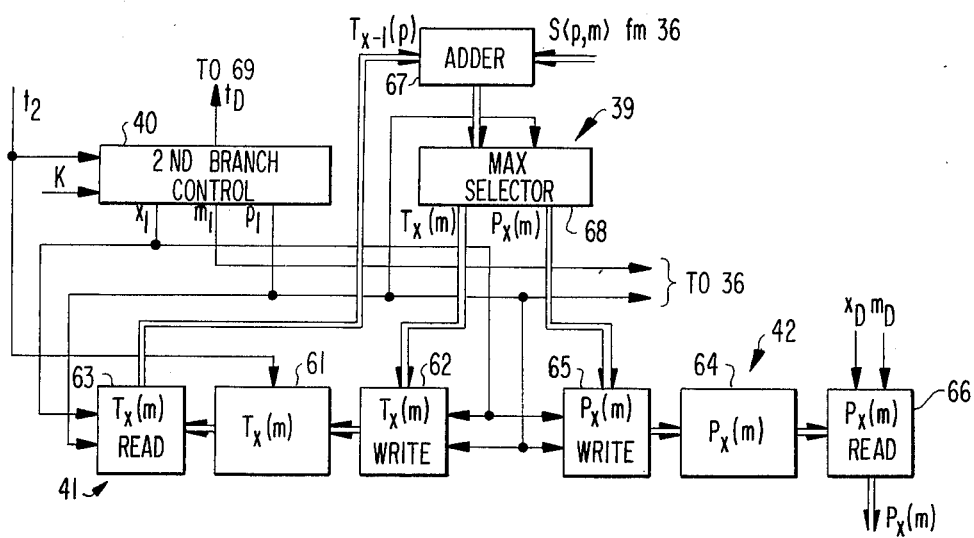
FIG. 9 is a block diagram exemplifying a second matching unit, a recurrence value table, and a provisional segmentation point table for use in a system according to this invention.

Referring now to FIG. 9, the control unit 20 (FIG. 1) produces a second timing pulse $t_2$ when the partial similarity measures and recognition results $S<p, m>$ and $n<p, m>$ are stored in the respective tables 36 and 37 for all necessary combinations $(p, m)$ of the start and end points $p$ and $m$. The second matching unit 39 may comprise a second matching control unit 40 similar to that described with reference to FIG. 4. Responsive to each second timing pulse $t_2$ and to the digit number signal K, the control unit 40 produces a local digit number signal $x_1$ successively varied from unity up to the specified digit number $k$. The recurrence value table 41 may comprise a plurality of recurrence registers 61, $k$ or more in number, specifiable by the local digit number signals $x_1$. Each recurrence register has addresses, I or more in number, specifiable by the start or end point signals $p$ or $m$. The second timing pulse $t_2$ clears the recurrence registers 61 to set therein the initial conditions for the recurrence formula (11). While the local digit number signal $x_1$ currently represents a specific one of the local digit numbers $x$, the control unit 40 successively produces local end point signals $m_1$ increasing from unity up to the input pattern duration I and, for each current local end point signal $m_1$, local start point signals $p_1$ increasing from unity to the current local end point signal $m_1$ less one.

Further referring to FIG. 9, the recurrence value table 41 comprises recurrence register write-in and read-out circuits 62 and 63. The provisional segmentation point table 42 may likewise comprise segmentation point registers 64 and segmentation point register write-in and read-out circuits 65 and 66. The write-in circuits 62 and 65 store a recurrence value $T_x(m)$ and a provisional segmentation point $P_x(m)$ calculated in the manner shortly described in the registers 61 and 64 at the addresses specified by the current local digit number and end point signals $x_1$ and $m_1$. Supplied with the current local digit number signal $x_1$ and each local start point signal $p_1$, the recurrence register read-out circuit 63 calculates the value $x - 1$ and reads out of the registers 61 a previous recurrence value $T_{x-1}(p)$ used in the recurrence formula (11) to supply the same to an adder 67 of the second matching unit 39. With the addresses specified by the current local end point signal $m_1$ and the local start point signals $p_1$, the partial similarity measure table 36 (FIG. 7) successively supplies the partial similarity measures $S<p, m>$ to the adder 67. The adder 67 therefore calculates the argument of the operator max of Equation (11) to successively supply the arguments to a maximum selector 68. The selector 68 may be similar in structure to that illustrated with reference to FIG. 8 and is supplied also with the local start point signals $p_1$. The selector 68 produces the calculated reference values and provisional segmentation points $T_x(m)$ and $P_x(m)$ to supply them to the respective write-in circuits 63 and 66. After completion of calculation of a recurrence value $T_x(m)$ and a provisional segmentation point $P_x(m)$ for the current local digit number and end point signals $x_1$ and $m_1$, the local end point signal $m_1$ is increased by one. When the calculation proceeds for the current local digit number signal $x_1$ to the input pattern duration I, the local digit number signal $x_1$ increases by one. When the calculation eventually reaches the input pattern duration I for the specified number $k$ of digits, the provisional segmentation point table 42 is loaded with provisional segmentation points $P_k(m)$. The control unit 40 now produces a decision timing pulse $t_D$ to command start of the decision step.

Referring to FIG. 7 again and to FIGS. 10 and 11 afresh, the system further comprises a decision unit 69 which may comprise, in turn, a decision of third branch control unit 70 responsive to the decision timing pulse $t_D$ for producing first, second, and third local timing pulses $t_{11}$, $t_{12}$, and $t_{13}$ in alternating time succession. The decision unit 69 further comprises a $k$-counter 71 for a digit number $x$, an $m$-register 72 for an end point $m$, a $p$-register 73 for a start point $p$, and an output buffer register 74 for a partial recognition result $n<p, m>$. The decision timing pulse $t_D$ sets in the $k$-counter 71 as the digit number $x$ the number $k$, such as 5, of digits specified by the digit number signal K and the $m$-register 72 as the end point $m$ the input pattern duration I, such as 60, represented by the current partial pattern end point signal $m$ which is now fixed at the input pattern duration I. The counter 71 and register 72 supply decision digit number and end point signals $x_D$ and $m_D$ representative of their respective contents to the provisional segmentation point table 42. Responsive to the signals $x_D$ and $m_D$, the segmentation point register read-out circuit 66 (FIG. 9) applies a provisional segmentation point $P_k(I)$, such as 48, to the $p$-register 73. Responsive to the first local timing pulse $t_{11}$, the $p$-register 73 is successively loaded with the read-out provisional segmentation points $P_x(m)$ as the start points $p$ and supplies a decision start point signal $p_D$ representative of the content thereof to the partial recognition result table 37. Supplied also with the decision end point signal $m_D$, the table 47 delivers a partial recognition result $n<p, m>$, such as $n<60, 48>$, to the output buffer register 74. Responsive to the second local timing pulse $t_{12}$, the buffer register 74 produces the partial recognition result $n<p, m>$ that specifies one of the numerals $n$ as the numeral of the $k$-th or least significant digit. The next following one of the third local timing pulse $t_{13}$ reduces the count of the $k$-counter 73 by one and substitutes the decision start point signal $p_D$ for the content $m$ of the $m$-register 72. The buffer register 74 successively produces the whole result of recognition $n(k)$, $n(k - 1)$, . . . , $n(2)$, and $n(1)$ as an output signal OUT. The decision unit 69 further comprises a zero detector 76 responsive to the decision digit number signal $x_D$ for producing an end pulse E to prepare the whole system for recognition of another input pattern when the count of the $k$-counter 71 is eventually reduced to zero.

The digit number specifier 50 may comprise a rotary switch or a plurality of push-button switches (not shown) preliminarily adjusted in compliance with a code for a desired or preselected number $k$ and to produce a digit number signal K in accordance with the code. The specifier 50 may produce the digit number signal K cyclically specifying a predetermined number of the preselected digit numbers $k$, such as three digit numbers $k$ for two, four, and one digit, according to a prescribed format. Alternatively, the specifier 50 may comprise first means for producing at the outset a first word number signal K specifying, for example, one word so as to put the whole system into operation and make the system produce an output signal OUT for an input pattern A indicative of the number of word or words of another input pattern to be thereafter recognized and second means responsive to the output signal OUT for automatically adjusting the first means to make the same produce a second word number signal K specifying the indicated number of word or words. Taking into consideration the following description of a digit number specifier 50 for use in a system according to the second aspect of this invention, it will be appreciated that the digit number specifier 50 produces, according to whichever of the first and second aspects, a digit number signal K representative of an integer for a predetermined duration which may, for the first aspect, be semipermanent.

Turning back to FIGS. 1 and 5, the system according to the first embodiment of this invention comprises a digit number specifier 50. Inasmuch as this system is for putting the first aspect of this invention into effect, the specifier 50 comprises a memory 80 for memorizing a set exemplified by Equation (1) of preselected digit numbers $k$. The set may be preliminarily manually put in the memory 80 or preliminarily set therein and automatically adjusted by a device which may be, as described in the next preceding paragraph, the system being illustrated. Responsive to the third timing pulse $t_3$, the specifier 50 produces a digit number signal K representative of the preselected digit numbers $k$ in predetermined time succession, such as 1, 3, 5, and 7. The third matching unit 49 may comprise a $k$-buffer register 81 for temporarily successively storing the preselected digit numbers $k$ to supply its content as a second local digit number signal $k$ to the recurrence value table 41. Inasmuch as the partial pattern end point signal $m$ is now indicative of the input pattern duration I, the table 41 successively produces first whole similarity measure signals $W_1$ representative of recurrence values $T_k(I)$, namely, the whole or overall similarity measures $T<k>$. The third matching unit 49 may further comprise a T-register 85, a $\hat{k}$-register 86, and a third comparator 88. The T-register 85, to which the first whole similarity measue signal $W_1$ is applied from the recurrence value table 41, is cleared by the third timing pulse $t_3$ and produces a second whole similarity measure signal $W_2$ representative of the content thereof. The local digit number signal $k$ is applied to the $\hat{k}$-register 86. The third comparator 88 is similar in structure to the first one 38 and compares the whole similarity measure signal $W_1$ supplied from the recurrence value table 41 with the second one $W_2$ and supplies a third write-in pulse $wp_3$ to the registers 85 and 86, only when $W_1 > W_2$, to store therein the first whole similarity measure $W_1$ and the local digit number $k$ applied thereto at the instant. It is now understood that the content of the $\hat{k}$-register 86 is the optimum number $\hat{k}$ of digits when the digit number signal K is varied throughout the preselected numbers $k$ of digits.

Finally referring to FIGS. 1 and 6, the main control unit 20 supplies a decision timing pulse $t_D$ to a decision unit 69 a predetermined time after the third timing pulse $t_3$, when the optimum number $\hat{k}$ of digits is obtained in their third matching unit 49. The decision unit 69 may comprise a decision control unit 70, a $k$-counter 71, an $m$-register 72, and an output register 74, all similar to the corresponding elements illustrated with reference to FIG. 10. It is to be pointed out that use is made here of the provisional segmentation point table 42 instead of the $p$-register 73 described hereinabove and that use may be made of the zero detector 76. Responsive to the decision timing pulse $t_D$, the control unit 70 produces first, second, and third local timing pulses $t_{11}$, $t_{12}$, and $t_{13}$ which are similar to those described with reference to FIG. 11 but are used in a somewhat different manner. The $k$-counter 71 and $m$-register 72 supply decision digit number and end point signals $x_D$ and $m_D$ representative of their contents to the provisional segmentation point and recognition result tables 42 and 43 to specify an address in each of the tables 42 and 43. The provisional segmentation point and recognition result $P_x(I)$ and $N_x(I)$ read out of the tables 42 and 43 are applied to the m-register 72 and output register 74. The output register 74 produces its content to give an output signal OUT. Responsive to the first local timing pulse $t_{11}$, the $k$-counter 71 and m-register 74 are loaded with the optimum number $\hat{k}$ of digits from the third matching unit 49 and with the input pattern duration I from the main control unit 20. The provisional segmentation point and recognition result $P_{\hat{k}}(I)$ and $N_{\hat{k}}(I)$ for the $\hat{k}$-th digit numeral $n(\hat{k})$ are therefore put into the m-register 72 and output register 74 in response to the first one of the second local timing pulse $t_{12}$. Shortly thereafter, the first one of the third local timing pulses $t_{13}$ is supplied to the $k$-counter 71 to change its content to $\hat{k} - 1$. Inasmuch as the decision end point signal $m_D$ is now representative of $P_{\hat{k}}(I)$, the registers 72 and 74 are loaded with $P_{\hat{k}}(P_{\hat{k}}(I))$ and $N_{\hat{k}-1}(P_{\hat{k}}(I))$ by the second one of the second local timing pulses $t_{12}$. The second one of the third local timing pulses $t_{13}$ changes the decision digit number signal $x_D$ to be representative of $\hat{k} - 2$. In this manner, the decision unit 69 produces the whole recognition result as the output signal OUT.

While two preferred embodiments of this invention and examples of several components thereof have thus far been described, it will readily be understood that these components and/or other elements can be modified in various ways. As called hereinabove the first through third branch control units, and the main, calculator, second matching, and decision control units 20, 30, 40, and 70 may be united or divided in various combinations. Also, other exemplified units and elements may be used in various combinations. Particurlaly, comparison of the units illustrated with reference to FIGS. 4 and 6 with the decision unit 69 exemplified in conjunction with the second embodiment will clearly tell that various modifications are possible in this area of the system. The input pattern buffer memory 25 may comprise, in combination, a buffer register for the above-mentioned sufficient number of the input pattern feature vectors $a_i$ and means for shifting in the register other input pattern feature vectors $a_i$ successively produced by the input unit 21. The recurrence value table 41 may comprise addresses of a smaller number for memorizing, as is the case with the input pattern buffer memory 25, only $T_{x-1}(p)$ for $p = 1$ through I. As described in the referenced United States Patent, it is possible to calculate the recurrence formula (11) in various manners and to define the similarity measure $S[A(p, m), B^n]$ in other ways. The set of the preselected digit numbers used in accordance with the second aspect of this invention may be given by a finite sequence of even numbers or of any other integers.

What is claimed is:

1. In a continuous speech recognition system comprising an input pattern buffer memory for temporarily memorizing an input pattern A represented by a time sequence of input pattern feature vectors $a_i$, I in number, as:

$$A = a_1, a_2, \ldots, a_i, \ldots, a_I$$

said input pattern being representative of a first predetermined number $\hat{k}$ of continuously spoken words, said first predetermined number being equal at least to unity; a reference pattern memory for memorizing reference patterns $B^n$ representative of a second predetermined number of words n, each reference pattern being represented by a time sequence of referene pattern feature vectors $b_j^n$, $J^n$ in number, as:

$$B^n = b_1^n, b_2^n, \ldots, b_j^n, \ldots, b_{J^n}^n;$$

and means responsive to said input and reference pattern feature vectors for recognizing said input pattern to be a concatenation of the reference patterns, $\hat{k}$ in number; the improvment wherein said means comprises a word number specifier for specifying the number K of words of said input pattern, said word number K being preselected for a predetermined duration to be equal at least to unity with reference to said first predetermined number; and recognition means responsive to said word number K and said input and reference pattern feature vectors for deciding said concatenation.

2. A continuous speech recognition system as claimed in claim 1, said word number K being preselected to be equal to said first predetermined number $\hat{k}$, wherein said recognition means comprises first matching means responsive to said input and reference pattern feature vectors for finding a partial similarity measure $S<p, m>$ and a partial recognition result $n<p, m>$, said partial similarity measure being defined as a maximum of similarity measures $S[A(p, m), B^n]$ between each partial pattern $A(p, m)$ and said reference patterns, said partial pattern being defined by a part of said input pattern feature vector sequence as:

$$A(p, m) = a_{p+1}, a_{p+2}, \ldots, a_m,$$

said partial recognition result being one of said reference patterns that gives said maximum; second matching means responsive to said word number K and the partial similarity measures for finding a maximum of summations, each being calculated for the partial similarity measures of those partial patterns, K in number, into a concatenation of which said input pattern is divided; and decision means responsive to said word number K and the partial recognition results for deciding said input pattern to be the partial recognition results for those partial patterns of a concatenation for which said maximum summation is found.

3. A continuous speech recognition sysem as claimed in claim 2, wherein said second matching means comprises means responsive to said partial similarity measures for finding segmentation points at which said input pattern is divided into those partial patterns of the concatenation for which said maximum summation is found, and said decision means comprises means responsive to said word number K for successively specifying consecutive integers between unity and said word number K and means responsive to said partial recognition results, said consecutive integers, and said segmentation points for successively selecting those partial recognition results with reference to said segmentation points which are for said partial pattern concatenation.

4. A continuous speech recognition system as claimed in claim 1, wherein said word number specifier comprises means for successively specifying said word number K as a finite sequence of different integers $k$, said integers including said first predetermined number $\hat{k}$, and said recognition means comprises first matching means responsive to said input and reference pattern feature vectors for finding a partial similarity measure $S<p, m>$ and a partial recognition result $n<p, m>$, said partial similarity measure being defined as a maximum of similarity measures $S[A(p, m), B^n]$ between each partial pattern $A(p, m)$ and said reference patterns, said partial pattern being defined by a part of said input pattern feature vector sequence as:

$$A(p, m) = a_{p+1}, a_{p+2}, \ldots, a_m, \text{overall}$$

said partial recognition result being one of said reference patterns that gives said maximum; second matching means comprising, in turn, first means for successively providing serial integers $x$ between unity and a greatest one of said different numbers and second means responsive to each of said serial integers and the partial similarity measures for finding an overall similarity measure $T<k>$ defined as a maximum of summations, each being calculated for the similarity measures of those partial paterns, $x$ in number, into a concatenation of which said input pattern is divided; third matching means responsive to said word number K and the overall similarity measures for deciding said first predetermined number to be one of said different integers that gives a maximum of the overall similarity measures found by said second matching means for said different integers; and decision means responsive to the first predetermined number found by said third matching means and the partial recognition results for deciding said reference pattern concatenation.

5. A continuous speech recognition system as claimed in claim 4, wherein said second matching means further comprises third means responsive to said serial integers and said partial similarity measures for finding a point sequence of provisional segmentation points at which said input pattern is divided into those partial paterns of the concatenation for which said maximum summation is found, and said decision means comprises means responsive to the first predetermined number found by said third means for successively specifying consecutive integers between unity and the last-mentioned predetermined number and means responsive to said partial recognition results, said consecutive integers, and the provisional segmentation points for finding those segmentation points aong the point sequences at which said input pattern is divided into the partial patterns, equal in number to said first predetermined number, the partial recognition results for the last-mentioned partial patterns giving said reference pattern concatenation.

6. A continuous speech recognition system as claimed in claim 5, further comprising fourth means operatively coupled to said second matching means for finding in response to said serial integers, said partial recognition results, and said overall similarity measures a sequence of provisional recognition results for those partial patterns, $x$ in number, of a concatenation into which said input pattern is divided to maximize the summation therefor, wherein said segmentation finding means comprises means operatively coupled to said fourth means and said consecutive integer specifying means for selecting a provisional recognition result sequence which consists of the provisional recognition results, equal in number to said first predetermined number, and which maximizes the overall similarity measure.

* * * * *

UNITED STATES PATENT AND TRADEMARK OFFICE
CERTIFICATE OF CORRECTION

PATENT NO. : 4,049,913

DATED : September 20, 1977

INVENTOR(S) : Hiroaki Sakoe

It is certified that error appears in the above-identified patent and that said Letters Patent are hereby corrected as shown below:

Column 1, line 28, delete "measured" and insert --measures--.

Column 2, line 40, delete "$b_2^{ni}$" and insert --$b_2^n$--.

Column 2, line 50, after "K", insert --of words--.

Column 3, line 57, delete "$b_{j1}^n$, $b_{j2}^n$" and insert --$b_{j1}^n$, $b_{j2}^n$--.

Column 3, line 61, delete "patters" and insert --patterns--.

Column 4, line 23, delete "digit" and insert --digits--.

Column 5, line 22, delete "p(x)]" and insert --p(x))--.

Column 5, line 49, delete "thirdmatching" and insert --third matching--.

Column 6, lines 4, 8 and 10, delete " $\max_{n}$" and insert --$\max_{n}$--.

Column 6, line 36, line should not be indented.

Column 6, line 52, delete "Kinsiki" and insert --Ninsiki--.

UNITED STATES PATENT AND TRADEMARK OFFICE
CERTIFICATE OF CORRECTION

PATENT NO. : 4,049,913    Page 2 of 4

DATED : September 20, 1977

INVENTOR(S) : Hiroaki Sakoe

It is certified that error appears in the above-identified patent and that said Letters Patent are hereby corrected as shown below:

Column 7, line 15, delete "30° /o" and insert --30%--.

Column 7, line 15, delete "$\underset{n}{\text{min}}$" and insert --$\underset{n}{\min}$--.

Column 7, line 32, delete "asregards" and insert --as regards--.

Column 7, line 44, delete "within" and insert --in--.

Column 7, line 49, delete "A(l[letter], m)" and insert --A(l[numeral], m)--.

Column 8, line 5, delete "$T_k^{(I)}$ for" and insert --$T_k(I)$ for--.

Column 8, line 16, after "p(2),...,", insert --p(x),...,--.

Column 8, line 55, delete "$\overset{\wedge}{k}$" and insert --$\hat{k}$--.

Column 8, line 64, delete "$\overset{\wedge}{K}$" and insert --$\hat{k}$--.

UNITED STATES PATENT AND TRADEMARK OFFICE
CERTIFICATE OF CORRECTION

PATENT NO. : 4,049,913
DATED : September 20, 1977
INVENTOR(S) : Kiroaki Sakoe

It is certified that error appears in the above-identified patent and that said Letters Patent are hereby corrected as shown below:

Column 9, line 2, delete "p" and insert --P--.

Column 9, lines 6-7, delete "$N_{\hat{k}-1}(p(\hat{k}-1))$" and insert --$N_{\hat{k}-1}(p(\hat{k}-1))$--.

Column 9, line 22, delete "specific" and insert --specified--.

Column 10, line 13, delete "$_n min$" and insert --$\underset{n}{min}$--.

Column 12, line 40, delete "one by 1" and insert --one by one--.

Column 13, line 10, delete "$_n max$" and insert --$\underset{n}{max}$--.

Column 13, line 15, delete "$_n min$" and insert --$\underset{n}{min}$--.

Column 13, line 42, delete "reucrrence" and insert --recurrence--.

Column 14, line 12, delete "compriss" and insert --comprises--.

UNITED STATES PATENT AND TRADEMARK OFFICE
CERTIFICATE OF CORRECTION

PATENT NO. : 4,049,913
DATED : September 20, 1977
INVENTOR(S) : Hiroaki Sakoe

It is certified that error appears in the above-identified patent and that said Letters Patent are hereby corrected as shown below:

Column 14, line 31, after "later", delete the period and insert a comma.

Column 15, line 47, delete "Theader." and insert --The adder--.

Column 16, line 6, delete "alternaing" and insert --alternating--.

Column 16, line 13, after "K and", insert --in--.

Column 17, line 53, delete "their" and insert --the--.

IN THE CLAIMS:

Column 19, line 39, delete "vied;" and insert --vided;--.

Column 20, line 36, delete "paterns" and insert --patterns--.

Column 20, line 45, delete "aong" and insert --among--.

Signed and Sealed this

Seventh Day of March 1978

[SEAL]

Attest:

RUTH C. MASON
Attesting Officer

LUTRELLE F. PARKER
Acting Commissioner of Patents and Trademarks